US007913305B2

(12) United States Patent
Bodorin et al.

(10) Patent No.: US 7,913,305 B2
(45) Date of Patent: Mar. 22, 2011

(54) SYSTEM AND METHOD FOR DETECTING MALWARE IN AN EXECUTABLE CODE MODULE ACCORDING TO THE CODE MODULE'S EXHIBITED BEHAVIOR

(75) Inventors: Daniel M. Bodorin, Kirkland, WA (US); Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 10/769,038

(22) Filed: Jan. 30, 2004

(65) Prior Publication Data

US 2005/0188272 A1   Aug. 25, 2005

(51) Int. Cl.
G06F 11/00 (2006.01)
(52) U.S. Cl. ............ 726/24; 714/38; 713/152; 713/177; 713/188
(58) Field of Classification Search .................. 726/22, 726/24; 714/38; 713/152, 177, 188
See application file for complete search history.

(56) References Cited

U.S. PATENT DOCUMENTS

| | | | | |
|---|---|---|---|---|
| 5,485,575 | A * | 1/1996 | Chess et al. | ............ 714/38 |
| 5,842,002 | A | 11/1998 | Schnurer et al. | |
| 5,983,348 | A | 11/1999 | Shuang | |
| 6,192,512 | B1 | 2/2001 | Chess | |
| 6,357,008 | B1 * | 3/2002 | Nachenberg | ............ 726/24 |
| 6,594,686 | B1 | 7/2003 | Edwards et al. | |
| 6,907,396 | B1 | 6/2005 | Muttik | |
| 6,968,461 | B1 | 11/2005 | Lucas et al. | |
| 7,203,681 | B1 | 4/2007 | Arnold et al. | |
| 7,620,990 | B2 | 11/2009 | Bodorin | |
| 2002/0035696 | A1 | 3/2002 | Thacker | |
| 2002/0056076 | A1 | 5/2002 | Van Der Made | |
| 2003/0014550 | A1 | 1/2003 | Fischer et al. | |
| 2003/0023865 | A1 | 1/2003 | Cowie et al. | |
| 2003/0065926 | A1 * | 4/2003 | Schultz et al. | ............ 713/188 |
| 2003/0101381 | A1 * | 5/2003 | Mateev et al. | ............ 714/38 |
| 2003/0110391 | A1 | 6/2003 | Wolff et al. | |
| 2003/0115479 | A1 | 6/2003 | Edwards et al. | |
| 2004/0015712 | A1 * | 1/2004 | Szor | ............ 713/200 |
| 2004/0054917 | A1 * | 3/2004 | Obrecht et al. | ............ 713/200 |
| 2004/0199827 | A1 * | 10/2004 | Muttik et al. | ............ 714/38 |
| 2005/0132206 | A1 | 6/2005 | Palliyl et al. | |
| 2005/0172115 | A1 | 8/2005 | Bodorin | |
| 2005/0172337 | A1 | 8/2005 | Bodorin | |
| 2006/0248582 | A1 | 11/2006 | Panjwani et al. | |

OTHER PUBLICATIONS

White et al., "Anatomy of a commercial-Grade Immune System", http://citeseer.ist.psu.edu/white99anatomy.html, 1999, pp. 1-28.*
C. Ko, "Execution Monitoring of Security-Critical Programs in Distributed Systems: A Specification-based Approach", PhD Thesis, UC Davis, 1996.

(Continued)

Primary Examiner — Kambiz Zand
Assistant Examiner — Hadi Armouche
(74) Attorney, Agent, or Firm — Workman Nydegger

(57) ABSTRACT

A malware detection system that determines whether an executable code module is malware according to behaviors exhibited while executing is presented. The malware detection system determines the type of code module and executes the code module in a behavior evaluation module for evaluating code corresponding to the code module's type. Some behaviors exhibited by the code module, while executing in the behavior evaluation module, are recorded as the code module's behavior signature. After the code module has completed its execution, the code module's behavior signature is compared against known malware behavior signatures stored in a malware behavior signature store. A determination as to whether the code module is malware is based on the results of the comparison.

9 Claims, 6 Drawing Sheets

OTHER PUBLICATIONS

Office Action mailed Mar. 23, 2007 cited in U.S. Appl. No. 10/769,097.
Office Action mailed Sep. 26, 2007 cited in U.S. Appl. No. 10/769,097.
Office Action mailed Jun. 11, 2008 cited in U.S. Appl. No. 10/769,097.
Office Action mailed Jan. 23, 2009 cited in U.S. Appl. No. 10/769,097.
Office Action mailed Sep. 29, 2009 cited in U.S. Appl. No. 10/769,097.
Office Action mailed Oct. 30, 2007 cited in U.S. Appl. No. 10/769,103.
Office Action mailed Jun. 17, 2008 cited in U.S. Appl. No. 10/769,103.
Office Action mailed Dec. 26, 2008 cited in U.S. Appl. No. 10/769,103.
Notice of Allowance mailed Jul. 20, 2009 cited in U.S. Appl. No. 10/769,103.
Notice of Allowance mailed Mar. 8, 2010 cited in U.S. Appl. No. 10/769,097.

* cited by examiner

SYSTEM AND METHOD FOR DETECTING MALWARE IN AN EXECUTABLE CODE MODULE ACCORDING TO THE CODE MODULE'S EXHIBITED BEHAVIOR

FIELD OF THE INVENTION

The present invention relates to a system and a method for proactively securing a computer against malware, and more particularly, a system and method for detecting malware in an executable code module according to the code module's exhibited behavior.

BACKGROUND OF THE INVENTION

As more and more computers are interconnected through various networks, such as the Internet, computer security also becomes increasingly more important. In particular, computer security in regard to external attacks from malware has become, and continues to become, increasingly more important. Malware, for purposes of the present discussion, are defined as unwanted computer attacks. As such, those skilled in the art will appreciate that malware includes, but is not limited to, computer viruses, Trojan horses, worms, denial of service attacks, abuse/misuse of legitimate computer system functions, and the like. The primary defense against malware is anti-virus software.

FIGS. 1A and 1B are pictorial diagrams illustrating how anti-virus software currently operates. In particular, FIG. 1A illustrates how anti-virus software detects known malware, and prevents the known malware from reaching and infecting a computer. Alternatively, FIG. 1B illustrates a common weakness of anti-virus software, particularly, how anti-virus software is unable to detect and prevent modified malware from reaching and infecting the computer. What is meant by "reaching" the computer is getting past the anti-virus software. Those skilled in the art will readily recognize anti-virus software almost always resides on the computer it is protecting, and operates on incoming data as it physically arrives at the computer. Thus, while incoming data, including malware, may be located at the computer, for purposes of the present invention, the incoming data does not actually "reach" the computer until it gets past the anti-virus software.

As shown in FIG. 1A, a malware 102 is directed over a network 106 to the computer 110, as indicated by arrow 108. It will be appreciated that the malware 102 may be directed to the computer 110 as a result of a request initiated by the computer, or directed to the computer from another network device. However, as mentioned above, before the known malware 102 reaches the computer 110, anti-virus software 104 installed on the computer intercepts the malware and examines it. As is known in the art, currently, anti-virus software scans the incoming data as a file, searching for identifiable patterns, also referred to as signatures, associated with known-malware. If a malware signature is located in the file, the anti-virus software 104 takes appropriate action, such as deleting the known malware/infected file, or removing the malware from an infected file, sometimes referred to as cleaning the file. In this manner, anti-virus software 104 is able to prevent the known malware 102 from infecting the computer 110, as indicated by the arrow 112.

Those skilled in the art will appreciate that almost all unknown malware are actually rewrites or reorganizations of previously released malware. Indeed, encountering an absolutely novel malware is relatively rare, as most "new" malware are actually rewrites or rehashes of existing malware. Malware source code is readily available, and it is a simple task for a malicious party to change variable names, reorder lines of code, or somehow superficially modify the malware.

The result of rehashing or rewriting an existing malware is that the static appearance of the malware is altered, though the functionality of the malware remains the same. Unfortunately, current anti-virus software operates only on known malware. Thus "new" malware, while functionally identical to its original/parent malware, is not detectable or stopped by the installed anti-virus software 104, due to its pattern matching system.

FIG. 1B is a pictorial diagram illustrating how current anti-virus software is unable to prevent a modified malware from reaching a computer. As shown in FIG. 1B, known malware 102 undergoes a modification process 114, such as a rehash or rewrite, resulting in modified malware 116. As mentioned above, the modified malware 116 will most likely have a different static appearance, though its functionality may be identical. As mentioned above, because the static appearance is modified, the modified malware 116 is not "known" malware recognized by the anti-virus software 104.

The modified malware 116 is directed through the network 106 to the computer 110, as indicated by arrow 118. As described above, the anti-virus software 104 attempts to identify the modified malware 116 to determine whether it is known malware and should be stopped. As the modified malware 116 is, as yet, an unknown modification, and because the signature of the modified malware is not the same as the original malware 102, the anti-virus software 104 fails to identify the modified malware as malware, and permits it to proceed to the computer 110, as indicated by arrow 120. Upon reaching the computer 110, the modified malware 116 may be able to perform its destructive purpose. It is only after an anti-virus software provider identifies a signature pattern for the modified malware 116, and then updates the anti-virus software 104, can the anti-virus software protect the computer 110 from the modified malware 116.

Constantly evaluating unknown malware to determine a static signature and then updating anti-virus software with that signature is a costly process. It is also inefficient, especially when considering that most malware are only superficially modified from other, known malware. Thus, it would be beneficial if malware could be identified, not just by its static signature, but rather by its exhibited behaviors. However, the only way to currently evaluate the exhibited behavior of malware is to somehow permit it to execute on a computer 110. Of course, this would be entirely unacceptable as the malware would perform its ill-intended effects on the computer 110 during its execution.

In light of the above-identified problems, it would be beneficial to computer users, both in terms of computer security and in terms of cost effectiveness, to have a malware detection system that operates in addition to, or separately from, current anti-virus software that protects a computer against rewritten or reorganized malware. This system should be able to detect malware according to its dynamic, exhibited behaviors, and not according to its static file organization. The present invention addresses this and other issues found in the prior art.

SUMMARY OF THE INVENTION

In accordance with aspects of the present invention, a malware detection system for determining whether an executable code module is malware according to the code module's exhibited behaviors is presented. The malware detection system includes at least one dynamic behavior evaluation module. Each dynamic behavior evaluation module provides a virtual environment in which a code module of a particular type may be safely executed. Each dynamic behavior evaluation module records some behaviors as a behavior signature, which the code module may exhibit during execution. The malware detection system also includes a management module that obtains the executable code module to be evaluated, determines the particular type of the code module, and selects the corresponding dynamic behavior evaluation module to execute the code module. The malware detection system further includes a malware behavior signature store that stores at least one known malware behavior signature, and a behavior signature comparison module that obtains the behavior signature of the evaluated code module and compares it against the known malware behavior signatures in the malware behavior signature store to determine if the code module is malware.

According to additional aspects of the present invention, a method for determining whether a code module is malware according to the code module's exhibited behaviors is presented. A dynamic behavior evaluation module for executing the particular type of code module is selected. The selected dynamic behavior evaluation module provides a virtual environment in which the code module may be safely executed. The code module is executed within the dynamic behavior evaluation module. During execution, some behaviors exhibited by the code module are recorded. The recorded behaviors of the code module are compared against known malware behaviors. According to the results of the comparison, a determination as to whether the code module is malware is made.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
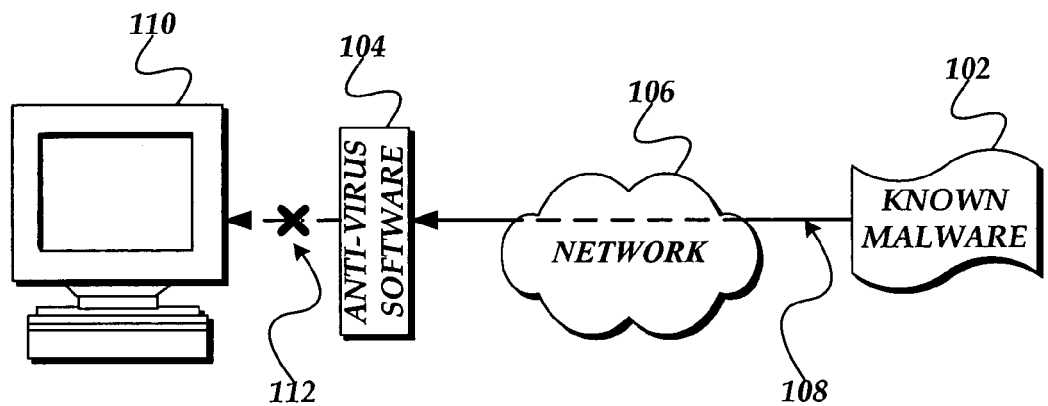
FIG. 1A is a pictorial diagram illustrating how current anti-virus software detects known malware, and prevents known malware from reaching and infecting a computer.
Figure 1B:
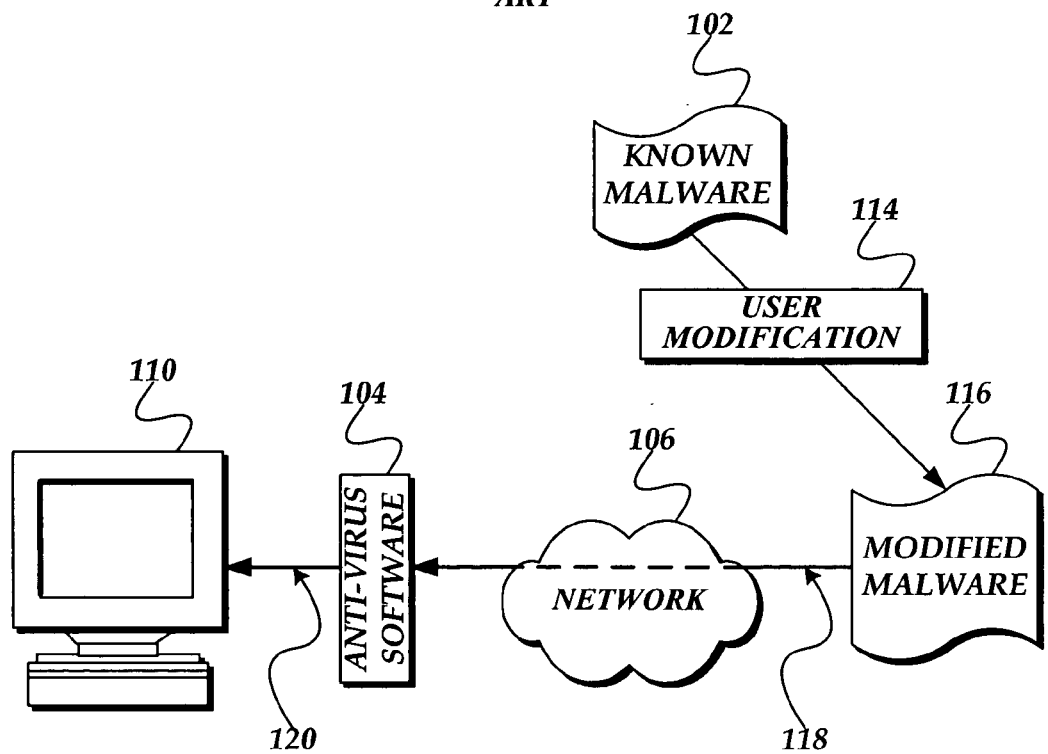
FIG. 1B is a pictorial diagram illustrating how current anti-virus software is unable to prevent modified malware from reaching the computer.
Figure 2:
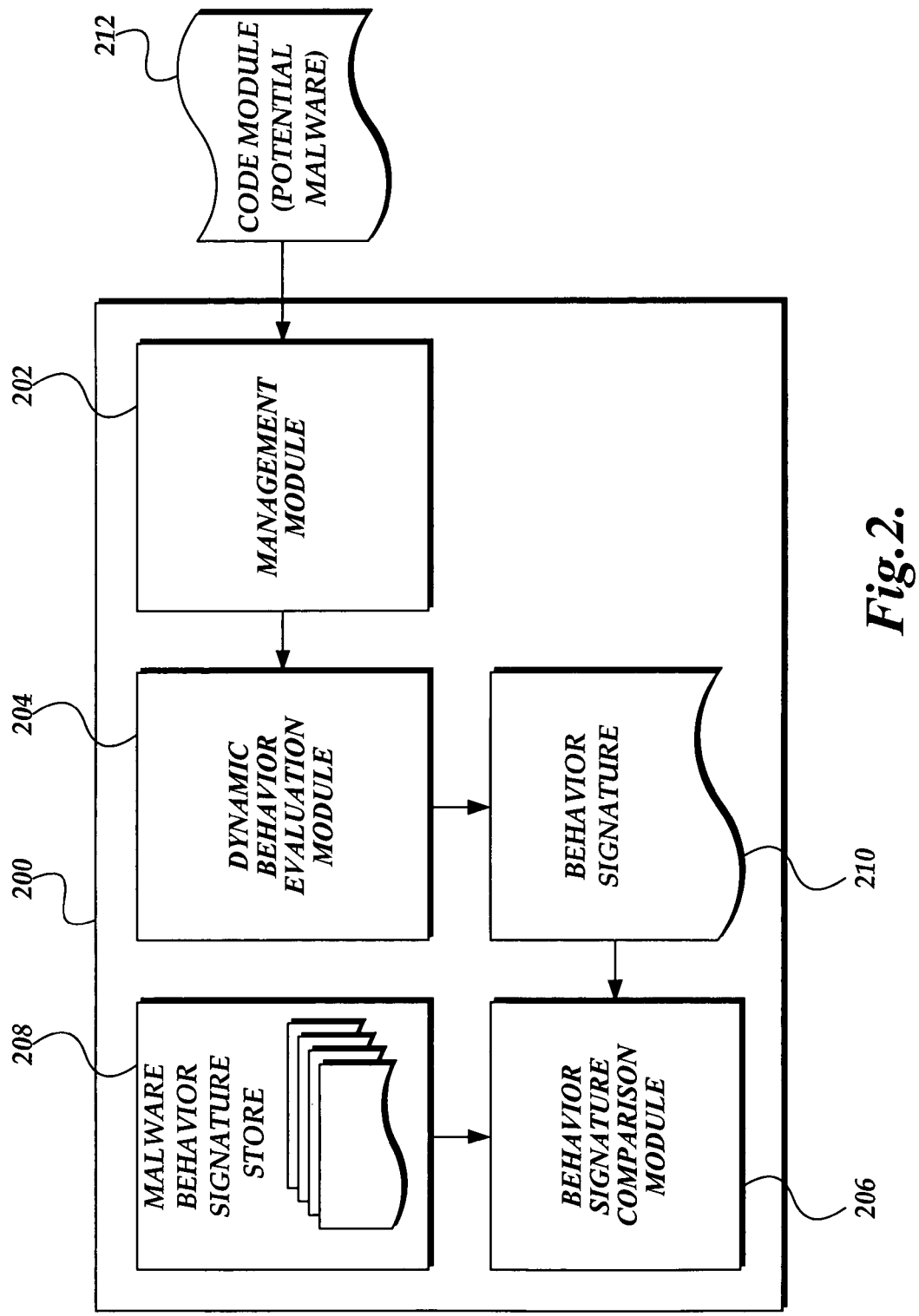
FIG. 2 is a block diagram of a malware detection system for detecting malware according to the exhibited, dynamic behavior of a code module.

FIG. 2 is a block diagram of a malware detection system for detecting whether a code module is malware according to its exhibited, dynamic behavior. It should be noted that the malware detection system described herein does not necessarily replace anti-virus software that is currently available. As mentioned above, current anti-virus software performs a static analysis of potential malware by scanning a code module's static configuration for known malware signatures. The malware detection system of the present invention performs a dynamic evaluation, i.e., evaluates whether a code module is malware based on the code module's behaviors exhibited during execution. Consequently, while the malware detection system may be used as a stand-alone product, it may also be used in conjunction with current anti-virus software. In fact, current anti-virus software may be more efficient in detecting known malware using the static signature matching system described above. Thus, when the present invention is used in combination with current anti-virus software, it may be beneficial to use the anti-virus software's signature matching techniques as a first step in securing a computer from malware, before turning to the malware detection system described herein.

It should be further noted that the malware detection system of the present invention need not be implemented on the same machine as anti-virus software, or on the computer for which protection is sought. Instead, the malware detection system described herein may be implemented on a third computing device, such as a firewall computer. Additionally, the malware detection system need not be running on the same type of computing device as the target computer.

With reference to FIG. 2, the malware detection system 200 includes a management module 202, at least one dynamic behavior evaluation module 204, a behavior signature comparison module 206, and a malware behavior signature store 208. Because code modules, such as code module 212, may come in a variety of executable formats, in operation, the management module 202 first evaluates the code module 212 to determine the appropriate type of dynamic behavior evaluation module needed for evaluating the code module.

For example, the code module 212 may be a MICROSOFT WINDOWS executable, a MICROSOFT .NET executable, a JAVA applet/application, any type of executable or application, and the like. Once the management module 202 determines the type of code module 212, the management module launches and/or calls a corresponding dynamic behavior evaluation module, such as dynamic behavior evaluation module 204, and hands the code module to the dynamic behavior evaluation module for execution.

Each dynamic behavior evaluation module, such as dynamic behavior evaluation module 204, represents a virtual environment, sometimes called a sandbox, in which the code module 212 may be "executed." To the code module 212, the dynamic behavior evaluation module 204 appears as a complete, functional computer system in which the code module may be executed. By using a virtual environment in which the code module 212 may operate, the code module may be executed such that its dynamic behaviors may be evaluated and recorded, while at the same time any destructive behaviors exhibited by the code module are confined to the virtual environment.

As the code module 212 executes within the dynamic behavior evaluation module 204, the dynamic behavior evaluation module records "interesting" behaviors exhibited by the code module. Interesting behaviors are those which a user or implementer of the malware detection system 200 has identified as interesting, potentially associated with malware, and are used to compare the behaviors of the code module 212 against known malware behaviors. Table A includes an exemplary, representative list of "interesting" behaviors, including parameters that are also considered interesting, that are recorded by a dynamic behavior evaluation module 204. It should be understood that these listed "interesting" behaviors are exemplary only, and should not be construed as limiting upon the present invention. Those skilled in the art will recognize that each individual type of code module may include a unique set of interesting behaviors. Additionally, as new features are added to each environment, or as computer systems change, additional behaviors may be added as "interesting," while others may be removed.

TABLE A

| | |
|---|---|
| RegisterServiceProcess ( ) | ExitProcess ( ) |
| Sleep ( ) | GetCommandLine ( ) |
| WinExec (application_name) | CreateProcessA (proces_name, parameters_list) |
| InternetOpenUrlA (URL_name) | GlobalAlloc ( ) |
| InternetOpenA (URL_name) | GetTickCount ( ) |
| IntenetClosetHandle ( ) | CopyFileA (new_name, existing_name) |
| CreateFileA (file_name) | GetWindowsDirectoryA( ) |
| ReadFile ( ) | GetSystemDirectoryA ( ) |
| WriteFile ( ) | GetModuleFileNameA ( ) |
| Close Handle ( ) | LoadLibraryA (library_name) |
| RegOpenKeyA (key_name) | GetProcAddress (procedure_name) |
| RegSetValueA (subkey_name) | FindFirstFileA (file_specificator) |
| RegSetValuExA (subkey_name) | FindNextFileA ( ) |
| RegCloseKey ( ) | FindClose ( ) |
| UrlDownloadToFileA (url_name, file_name) | |

The dynamic behavior evaluation module 204 records the "interesting" behaviors exhibited by the executing code module 212 in a file, referred to as a behavior signature 210. Once the code module 212 has completed its execution in the dynamic behavior evaluation module 204, the behavior signature 210 is stored for subsequent use.

Once the behavior signature 210 has been generated, the behavior signature comparison module 206 takes the behavior signature and compares it against behavior signatures of known malware that are stored in the malware behavior signature store 208. The malware behavior signature store 208 is a repository of behavior signatures of known malware. However, unlike signature files of antivirus software 104, behavior signatures stored in the malware behavior signature store 208 are based on exhibited behaviors of malware. As such, even though all variable names and routine names within source code for malware are modified by a malicious party, the exhibited behaviors of the malware remain the same, and will be detected by the malware detection system 200 when the behavior signature comparison module 206 matches a code module's behavior signature 210 to a known malware's behavior signature in the malware behavior signature store 208.

According to aspects of the present invention, if the behavior signature comparison module 206 is able to completely match the behavior signature 210 against a known malware behavior signature in the malware behavior signature store 208, the malware detection system 200 will report that the code module is malware. However, quite often, not all behaviors of an original malware are essential for a modified malware to perform its destructive purpose. Thus, according to further aspects of the present invention, if no complete match exists, yet there is a partial match between the behavior signature 210 and any of the malware behavior signatures in the malware behavior signature store 208, the malware detection system 200 may report that the code module 212 is possibly malware. According to yet further aspects, the malware detection system 200 may report the likelihood that the code module 212 is malware according to the percentage of behaviors that match a particular known malware signature. Alternatively, specific subsets of behaviors within known malware signatures may be specially identified, such that if there is a positive match between behaviors in the behavior signature 210 and the subset of specially identified behaviors of a known malware behavior signature, the malware detection system 200 may report a more positive identification of malware.

It is anticipated that the malware behavior signature store 208 will be periodically updated with behavior signatures of known malware. The malware behavior signature store 208 should be especially updated as the more rare, "new" malware is discovered.

Figure 3A:
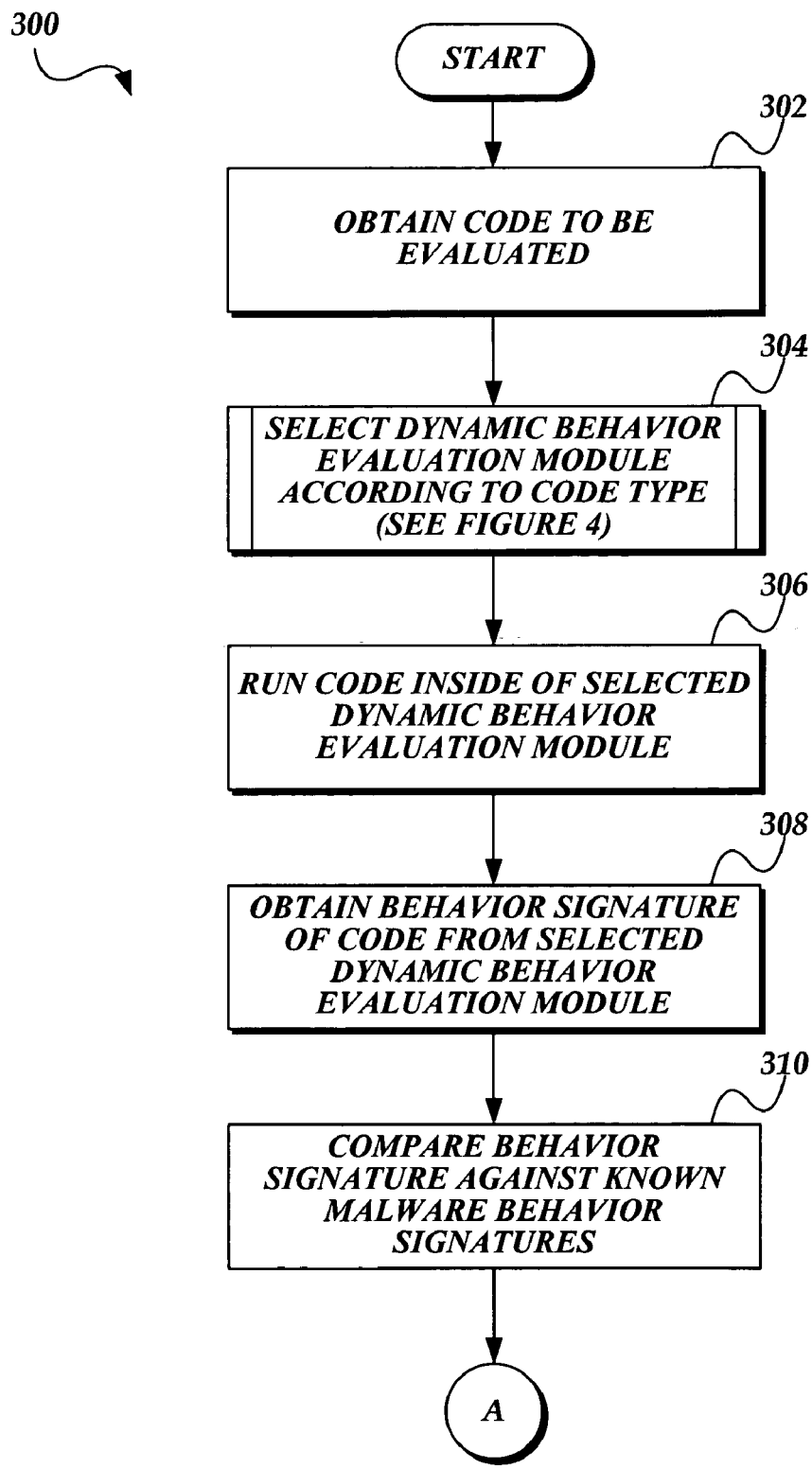
FIGS. 3A and 3B are flow diagrams illustrating an exemplary routine for determining whether a code module is malware according to its exhibited behavior.
Figure 3B:
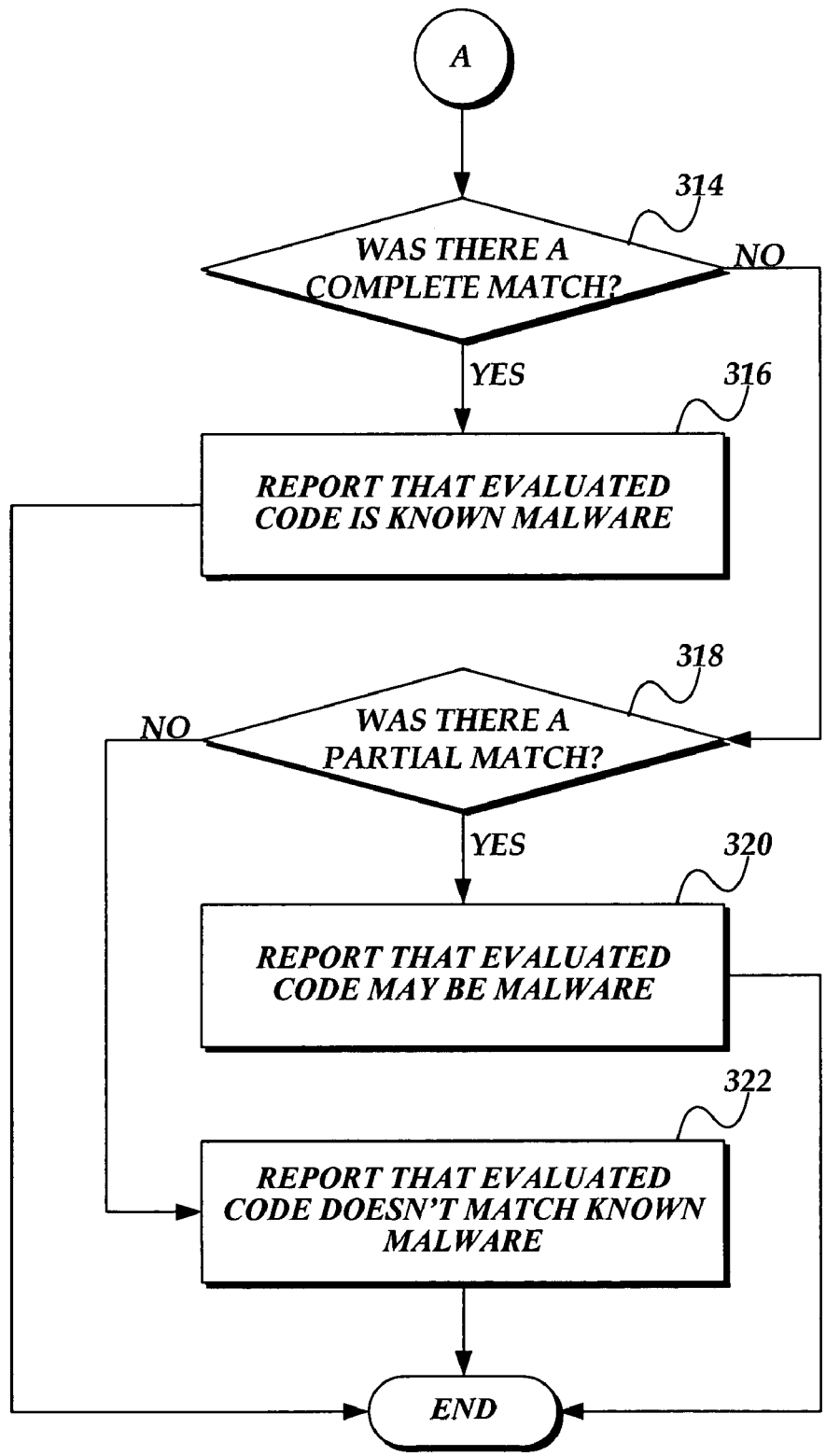

FIGS. 3A and 3B are flow diagrams illustrating an exemplary routine for determining whether a code module is malware according to its exhibited behavior. Beginning at block 302, the malware detection system 200 obtains the code module 212 to be evaluated. At block 304, a dynamic behavior evaluation module 204 is selected according to the code module's executable type. Selecting a dynamic behavior evaluation module 204 according to the code module's type is described below in regard to FIG. 4.

Figure 4:
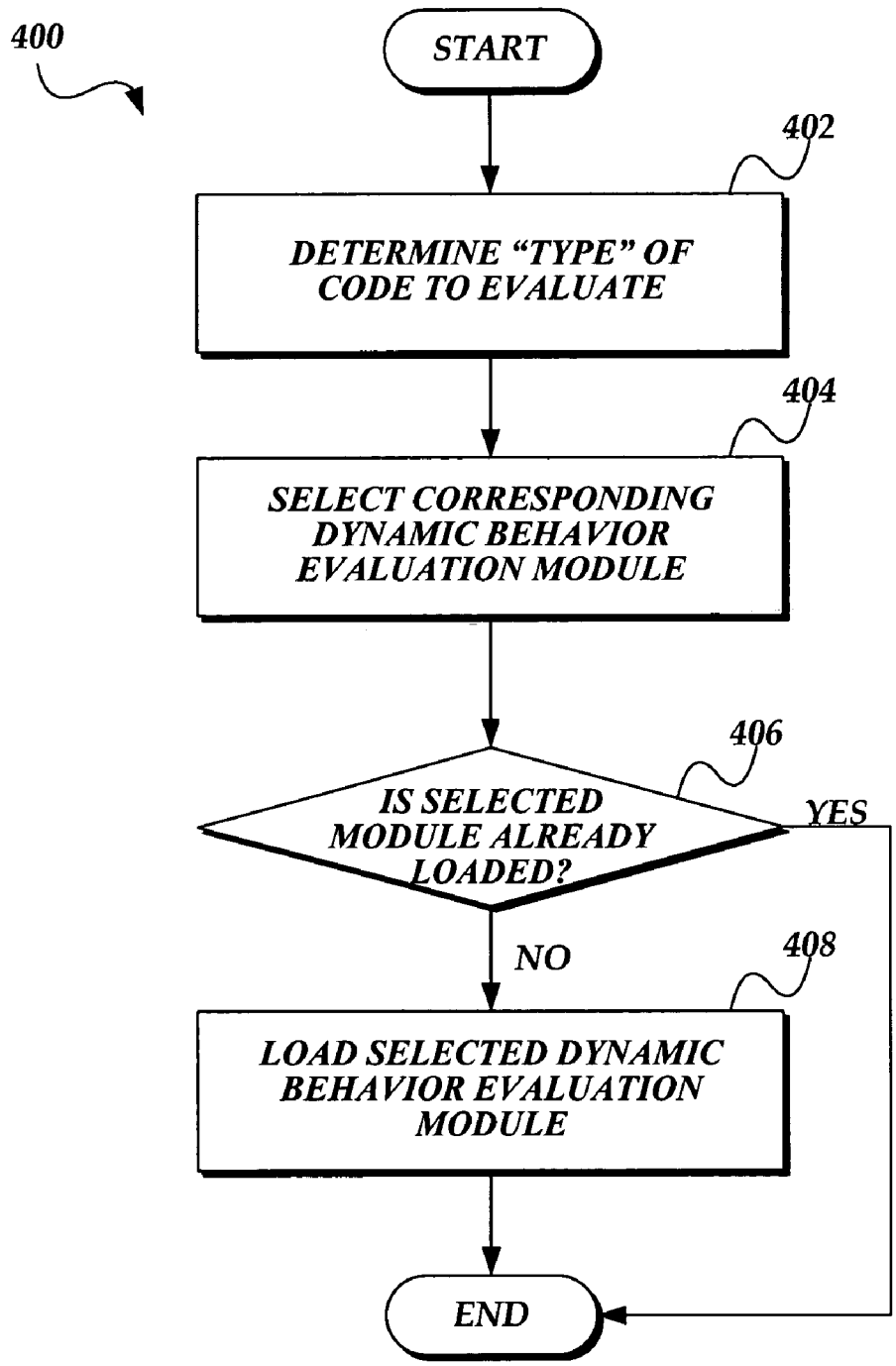
FIG. 4 is a flow diagram for dynamically allocating a dynamic behavior evaluation module for evaluating a code module and recording the "interesting" behaviors exhibited by the code module in a behavior signature.

FIG. 4 is a flow diagram for dynamically allocating a dynamic behavior evaluation module 204 for evaluating a code module 212 and recording the "interesting" behaviors exhibited by the code module in a behavior signature 210. Beginning at block 402, the code module 212 is examined to determine its type. Examining a code module 212 and determining the type of code module is known in the art.

At block 404, a dynamic behavior evaluation module 204 corresponding to the code module's type is selected. According to one embodiment of the present invention, the dynamic behavior evaluation module 204 may be implemented as a loadable module. Accordingly, at decision block 406, a determination is made as to whether the dynamic behavior evaluation module 204 is already loaded. If it is not loaded, at block 408, the dynamic behavior evaluation module 204 is loaded. The dynamic behavior evaluation module 204 is loaded, or after having loaded the dynamic behavior evaluation module the routine 400 terminates.

It should be understood that in an alternative embodiment, each dynamic behavior evaluation module is implemented as an integral element of the malware detection system 200. As such, checking to determine whether a dynamic behavior evaluation module 204 is loaded is unnecessary.

With reference again to FIG. 3A, after having selected the dynamic behavior evaluation module 204, at block 306, the code module 212 is launched, i.e., executed, within the selected dynamic behavior evaluation module. As described above, as the code module 212 is executed within the dynamic behavior evaluation module 204, interesting behaviors are recorded in a behavior signature 210. Upon completion of execution of the code module 212, at block 308, the code module's behavior signature 210 is obtained from the selected dynamic behavior evaluation module. At block 310, the behavior signature 210 is compared against known malware behavior signatures stored in the malware behavior signature store 208.

At decision block 314, a determination is made as to whether there was a complete match between the behavior signature 210 and a behavior signature in the malware behavior signature store 208. If there was a complete match, at block 316, the malware detection system 200 reports that the evaluated code module 212 is known malware. Thereafter, the routine 300 terminates.

If there was not a complete match between the behavior signature 210 and the behavior signatures in the malware behavior signature store 208, at decision block 318, a further determination is made as to whether there was at least a partial match. If there was a partial match between the behavior signature 210 and a behavior signature in the malware behavior signature store 208, at block 320, the malware detection system reports that the evaluated code module 212 may be malware. As previously discussed, the decision to report that the evaluated code module 212 may be malware may be made according to the percentage of matched behaviors, or according to whether the behavior signature 210 matched a specific subset of a known malware behavior signature. Other determinations based on partial matches may also be utilized. After reporting that the evaluated code module 212 may be malware, the routine 300 terminates.

If the behavior signature 210 for the evaluated code module 212 does not match any behavior signatures stored within the malware behavior signature store 208, at block 322, the malware detection system 200 reports that the evaluated code module does not match any known malware. Of course, those skilled in the art will readily recognize that this does not mean that the evaluated code module 212 is not malware, just that it is not recognizable according to its dynamic behaviors. Thereafter, the routine 300 terminates.

Figure 5A:
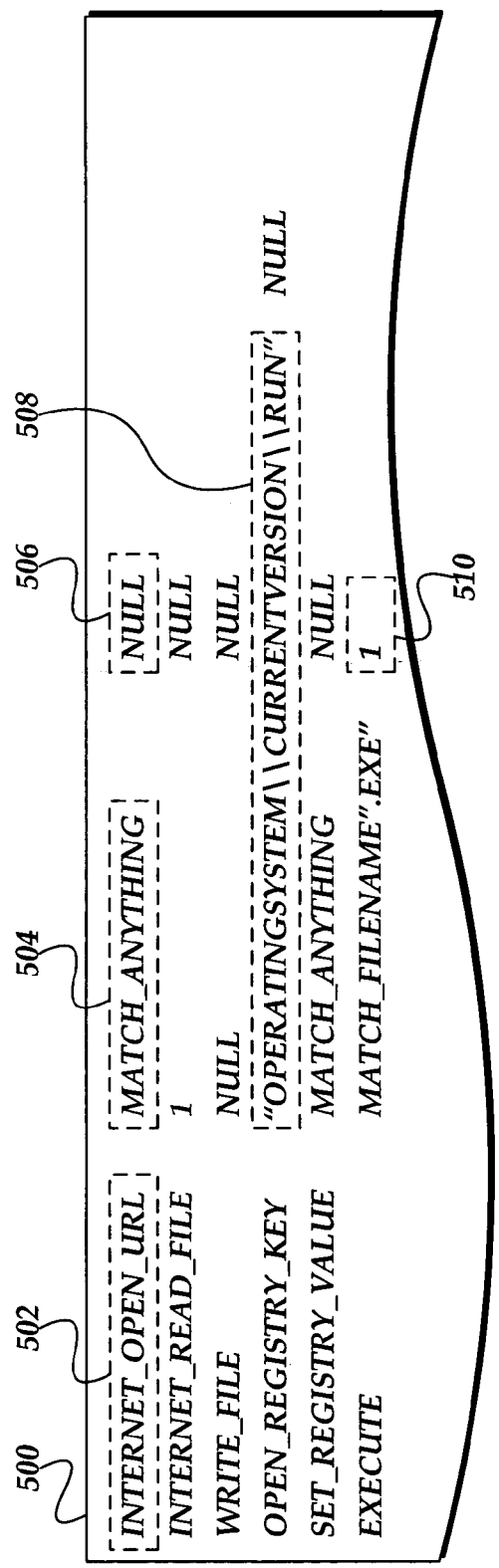
FIGS. 5A and 5B are block diagrams illustrating exemplary behavior signatures of hypothetical code modules.
Figure 5B:
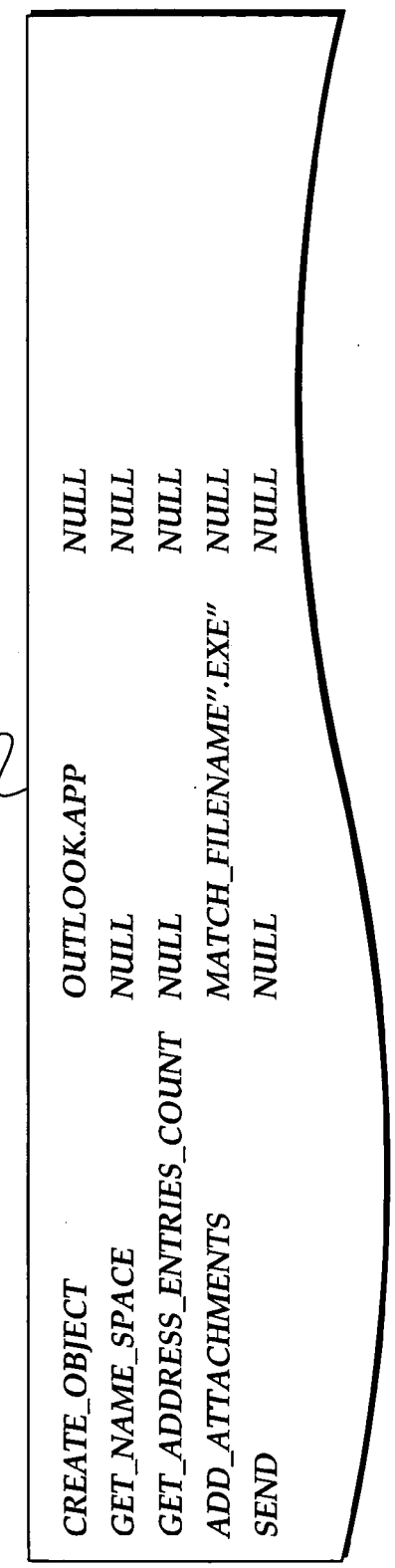

FIGS. 5A and 5B are block diagrams illustrating exemplary behavior signatures of hypothetical code modules, such as the behavior signature 210 described above. Each row of items in the exemplary behavior signatures, including behavior signature 500 and behavior signature 512, represents a behavior that was exhibited by a code module and recorded by the dynamic behavior evaluation module 204.

As illustrated in both behavior signature 500 and behavior signature 512, each behavior includes three elements: a behavior token, such as behavior token 502; a first parameter value, such as parameter value 504; and a second parameter value, such as parameter value 506. It should be understood that the described embodiment of behavior signatures is for illustration purposes only, and should not be construed as limiting upon the present invention. The actual organization of a behavior signature may vary substantially.

A behavior token, such as behavior token 502, is used to identify the particular "interesting" behavior recorded by the dynamic behavior evaluation module 204. Each interesting behavior recorded by the dynamic behavior evaluation module 204 is associated with a unique token, such as behavior token 502. In contrast, parameter values may include almost any type of value. For example, a parameter value, such as parameter 504, may represent a token to match anything. Alternatively, a parameter value may not be necessary or desirable. In such cases, a parameter value of "null," such as parameter value 506, may be added to indicate that there is no parameter present. Further, a parameter value such as parameter value 510, may be a numeric value, or, as in the case of parameter value 508, may be a string passed to the interesting behavior and which is important for comparison purposes.

In regard to FIGS. 5A and 5B, behavior signature 500 of FIG. 5A illustrates behaviors associated with a so-called "Trojan horse" malware, while behavior signature 512 of FIG. 5B illustrates behaviors associated with a mass mailing worm.

Embodiments within the scope of the present invention also include computer-readable media for carrying or storing computer-executable instructions and/or data structures. Computer-readable media is divided into two separate categories: storage media and communication media. Storage media is defined as all computer-readable media other than signals. Communication media is defined as signals. Storage media should not be construed as including signals.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A malware detection system for determining whether a code module is malware according to the code module's exhibited behaviors, the system comprising memory storing the following computer executable components:

at least one dynamic behavior evaluation module, wherein each dynamic behavior evaluation module provides a virtual environment for executing a code module of a particular type, and wherein each dynamic behavior evaluation module records interesting API function calls that the code module makes as it is executed, wherein the interesting API function calls are specified by a user and comprise a portion of all API function calls that the code module makes, wherein only the interesting API function calls, but not all API function calls, that the code module makes during execution in the dynamic behavior evaluation module are recorded into a behavior signature corresponding to the code module;

a management module, wherein the management module obtains the code module, and wherein the management module evaluates the code module to determine the code module's type, and wherein the management module selects a dynamic behavior evaluation module to execute the code module according to the code module's type;

a malware behavior signature store storing at least one known malware behavior signature of a known malware, wherein each of the at least one known malware behavior signature is comprised of only the interesting API function calls as specified by the user;

a behavior signature comparison module that obtains the behavior signature of the code module and compares the behavior signature of the code module to the known malware behavior signatures in the malware behavior signature store to determine whether the interesting API function calls recorded in the behavior signature of the code module match the interesting API function calls in any of the known malware behavior signatures; and wherein the malware detection system is configured to report whether the code module is a known malware based at least in part on the degree that the interesting API function calls recorded in the behavior signature of the code module match the interesting API function calls in a behavior signature of the known malware.

2. A malware detection system for determining whether a code module is malware according to the code module's exhibited behaviors, the system comprising memory storing the following computer executable components:

at least one behavior evaluation module, wherein each behavior evaluation module provides a virtual environment for executing a code module of a particular type, and wherein each behavior evaluation module records interesting API function calls that the code module makes as it is executed, wherein the interesting API function calls are specified by a user and comprise a portion of all API function calls that the code module makes, wherein only the interesting API function calls, but not all API function calls, that the code module makes during execution in the dynamic behavior evaluation module are recorded into a behavior signature corresponding to the code module;

a management module obtaining the code module and determining the code module's type for the purpose of selecting a behavior evaluation module to execute the code module according to the code module's type;

a storage module for storing at least one known malware behavior signature of a known malware, wherein each of the at least one known malware behavior signature is comprised of only interesting function calls as specified by the user;

a behavior comparison module for comparing the behavior signature of the code module to the known malware behavior signatures in the storage module to determine whether the interesting API function calls recorded in the behavior signature of the code module match the interesting API function calls in any of the known malware behavior signatures; and wherein the malware detection system is configured to report whether the code module is a known malware based at least in part on the degree that the interesting API function calls recorded in the behavior signature of the code module match the interesting API function calls in a behavior signature of the known malware.

3. A method for determining whether a code module is malware according to the code module's exhibited behaviors, the method comprising:

receiving input from a user that specifies interesting API functions calls, wherein the interesting API function calls are a portion of API function calls that can be made by a code module;

receiving a code module to be evaluated to determine whether the code module includes malware;

selecting a dynamic behavior evaluation module according to the executable type of the code module as determined by a management module;

executing the code module in the selected dynamic behavior evaluation module, wherein the selected dynamic behavior evaluation module provides a virtual environment in which the code module may be safely executed;

recording each interesting API function call that the code module makes while being executed in the dynamic behavior evaluation module to create a behavior signature for the code module;

comparing the recorded interesting API function calls in the behavior signature for the code module to the interesting API functions calls of a behavior signature of a known malware;

according to the results of the previous comparison, determining whether the code module is the known malware; and reporting whether the code module is the known malware based at least in part on the degree that the interesting API function calls recorded in the behavior signature of the code module match the interesting API function calls of the behavior signature of the known malware.

4. A storage medium storing computer-executable instructions which, when executed, carry out a method for determining whether an executable code module is malware according to the code module's exhibited behaviors, the method comprising:

receiving input from a user that specifies interesting API functions calls, wherein the interesting API function calls are a portion of API function calls that can be made by a code module;

receiving a code module to be evaluated to determine whether the code module includes malware;

selecting a dynamic behavior evaluation module according to the executable type of the code module as determined by a management module;

executing the code module in the selected dynamic behavior evaluation module, wherein the selected dynamic behavior evaluation module provides a virtual environment in which the code module may be safely executed;

recording each interesting API function call that the code module makes while being executed in the dynamic behavior evaluation module to create a behavior signature for the code module;

comparing the recorded interesting API function calls in the behavior signature for the code module to the interesting API function calls of a behavior signature of a known malware;

according to the results of the previous comparison, determining whether the code module is the known malware; and reporting whether the code module is the known malware based at least in part on the degree that the interesting API function calls recorded in the behavior signature of the code module match the interesting API function calls of the behavior signature of the known malware.

5. The malware detection system of claim 1 or 2, wherein at least some of the interesting API function calls are system calls.

6. The method of claim 3, wherein at least some of the interesting API function calls are system calls.

7. The storage medium of claim 4, wherein at least some of the interesting API function calls are system calls.

8. The malware detection system of claim 1, wherein the malware detection system is further configured to report a positive identification of a known malware.

9. The malware detection system of claim 2, wherein the malware detection system is further configured to report a positive identification of a known malware.

* * * * *